(12) United States Patent
Mayberry et al.

(10) Patent No.: US 8,544,153 B2
(45) Date of Patent: Oct. 1, 2013

(54) LOCKABLE SNAP-CLIP FASTENER

(75) Inventors: Michael T. Mayberry, Denver, CO (US); Brad Bennett, Lafayette, CO (US)

(73) Assignee: Magpul Industries Corp, Erie, CO (US)

( * ) Notice: Subject to any disclaimer, the term of this patent is extended or adjusted under 35 U.S.C. 154(b) by 29 days.

(21) Appl. No.: 13/439,034

(22) Filed: Apr. 4, 2012

(65) Prior Publication Data
US 2013/0097822 A1    Apr. 25, 2013

Related U.S. Application Data

(60) Provisional application No. 61/533,104, filed on Sep. 9, 2011.

(51) Int. Cl.
*F41C 23/00*  (2006.01)
*F16B 2/10*   (2006.01)

(52) U.S. Cl.
USPC ............... 24/2.5; 24/600.2; 24/193; 224/150

(58) Field of Classification Search
USPC ................. 224/150, 913; 24/2.5, 170, 191, 24/192, 193, 509, 599.5, 599.8, 600.2, 932
See application file for complete search history.

(56) References Cited

U.S. PATENT DOCUMENTS

| | | | | |
|---|---|---|---|---|
| 186,637 A | * | 1/1877 | Tanner | 24/599.5 |
| 1,032,369 A | * | 7/1912 | Baxter | 24/599.6 |
| 2,896,288 A | * | 7/1959 | Davis | 24/323 |
| 3,074,136 A | * | 1/1963 | Looker | 24/165 |
| 3,358,340 A | * | 12/1967 | Higuchi | 24/599.8 |
| 4,667,379 A | * | 5/1987 | Tsamas et al. | 24/636 |
| 5,279,021 A | * | 1/1994 | Edgin | 24/647 |
| 5,398,389 A | | 3/1995 | Terada et al. | |
| 5,832,571 A | * | 11/1998 | Kanamori | 24/599.6 |
| 6,505,487 B1 | | 1/2003 | Garel et al. | |
| 6,530,196 B1 | * | 3/2003 | Oyster et al. | 54/85 |
| 6,588,076 B1 | | 7/2003 | Choate | |
| 6,802,109 B2 | * | 10/2004 | Hede et al. | 24/318 |
| 7,784,121 B2 | | 8/2010 | Ahlman | |
| D632,954 S | * | 2/2011 | Fitzpatrick et al. | D8/395 |
| 8,042,235 B2 | * | 10/2011 | Wu | 24/323 |
| D679,580 S | * | 4/2013 | Fitzpatrick et al. | D8/395 |
| 2002/0174815 A1 | | 11/2002 | Tylaska | |

FOREIGN PATENT DOCUMENTS

FR    2303986    10/1976

* cited by examiner

*Primary Examiner* — Robert J Sandy
*Assistant Examiner* — Louis Mercado
(74) *Attorney, Agent, or Firm* — Geoffrey E. Dobbin; Dobbin IP Law P.C.

(57) ABSTRACT

A lockable snap-clip fastener with two spring-biased jaw members and a slidable locking bar. The locking bar is held in position by the same spring that biases the jaws. As the bar is held in either the locked or unlocked position, it must be positively actuated in order to transition from one configuration to the other.

3 Claims, 6 Drawing Sheets

LOCKABLE SNAP-CLIP FASTENER

CROSS-REFERENCES TO RELATED APPLICATIONS

This Application claims priority as a non-provisional perfection of prior filed U.S. Provisional Application number 61/533,104, filed Sep. 9, 2011 and incorporates the same by reference in its entirety.

FIELD OF THE INVENTION

The present invention relates to the field of fasteners and more particularly relates to a lockable snap-clip fastener.

BACKGROUND OF THE INVENTION

The present invention is a lockable snap clip that comprises fewer parts than prior art snap clips and uses them in a simple arrangement which makes the snap clip of the present invention advantageous over the prior art.

The present invention represents a departure from the prior art in that the snap clip of the present invention allows for a lockable snap clip which is simple and intuitive to use that will remain in either a locked or unlocked configuration until the user desires to switch from one to the other.

SUMMARY OF THE INVENTION

In view of the foregoing disadvantages inherent in the known types of snap-clip fasteners, this invention provides a lockable snap-clip fastener. As such, the present invention's general purpose is to provide a new and improved lockable snap-clip fastener that is easy and intuitive to use, uses few component parts and is economical to manufacture.

To accomplish these objectives, the snap-clip fastener according to the present invention comprises two jaw members joint at a pivot and biased by a spring in a closed position. A locking bar passes through one jaw member and slides underneath an end of the spring. The bar may pass to one side or the other of the jaw member through which it passes and is held in position by the spring. In one position, the bar blocks passage of the other jaw member, while it allows passage in the other position.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, the preferred embodiment of the locking snap-clip fastener is herein described. It should be noted that the articles "a", "an", and "the", as used in this specification, include plural referents unless the content clearly dictates otherwise.

Figure 1:
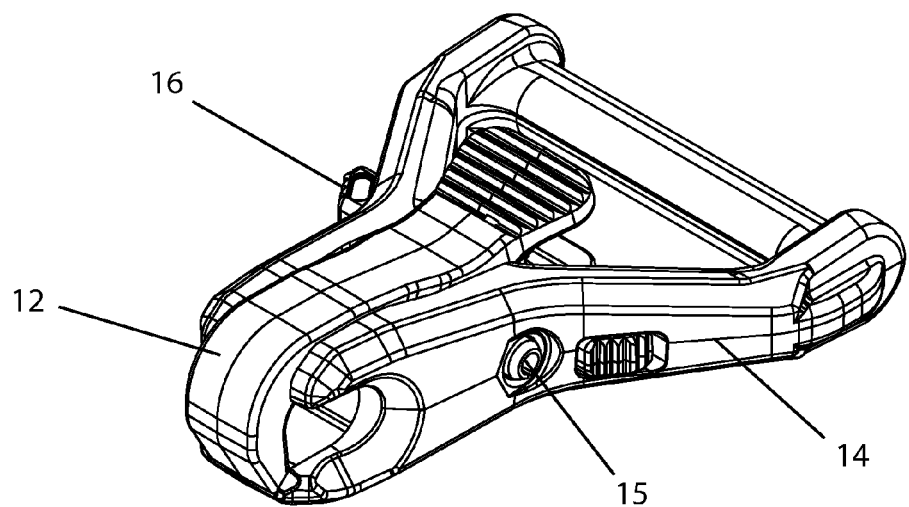
FIG. 1 is a perspective view of a fastener depicting the best mode of the present invention.
Figure 2:
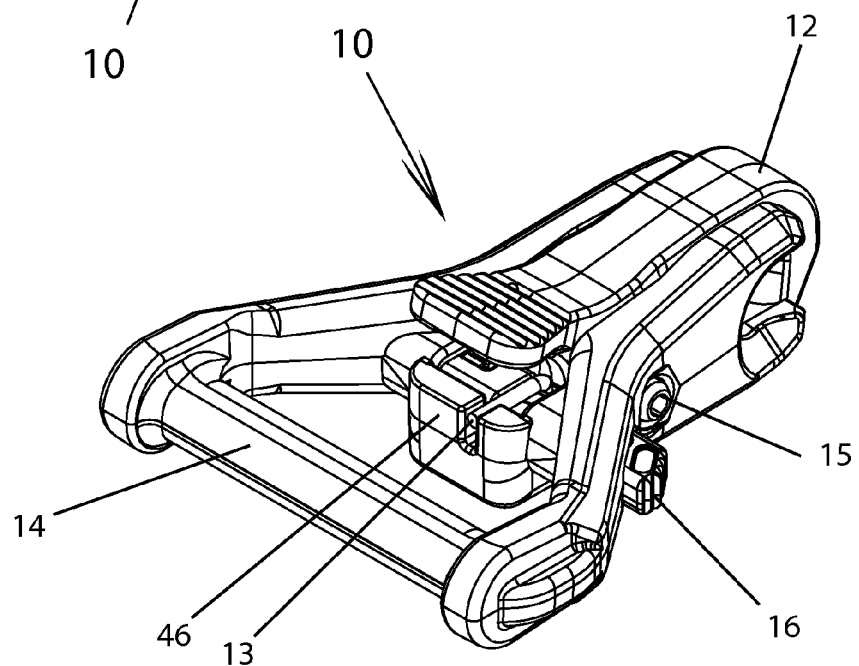
FIG. 2 is an alternate perspective view of the fastener of FIG. 1.

With reference to FIGS. 1 and 2, the fastener 10 is formed of two jaw bodies, a mandible 12 and a maxilla 14. Maxilla 14 cradles mandible 12. The mandible 12 and maxilla 14 pivot relative to each other about a roll pin 15 and are biased in a closed position by torsion spring 13. Lock bar 16 passes through a middle portion of the maxilla 14 and may selectively impede movement of the mandible 12 relative thereto. This impediment allows the fastener 10 to be locked in an immovable position at the will of the user.

Figure 3:
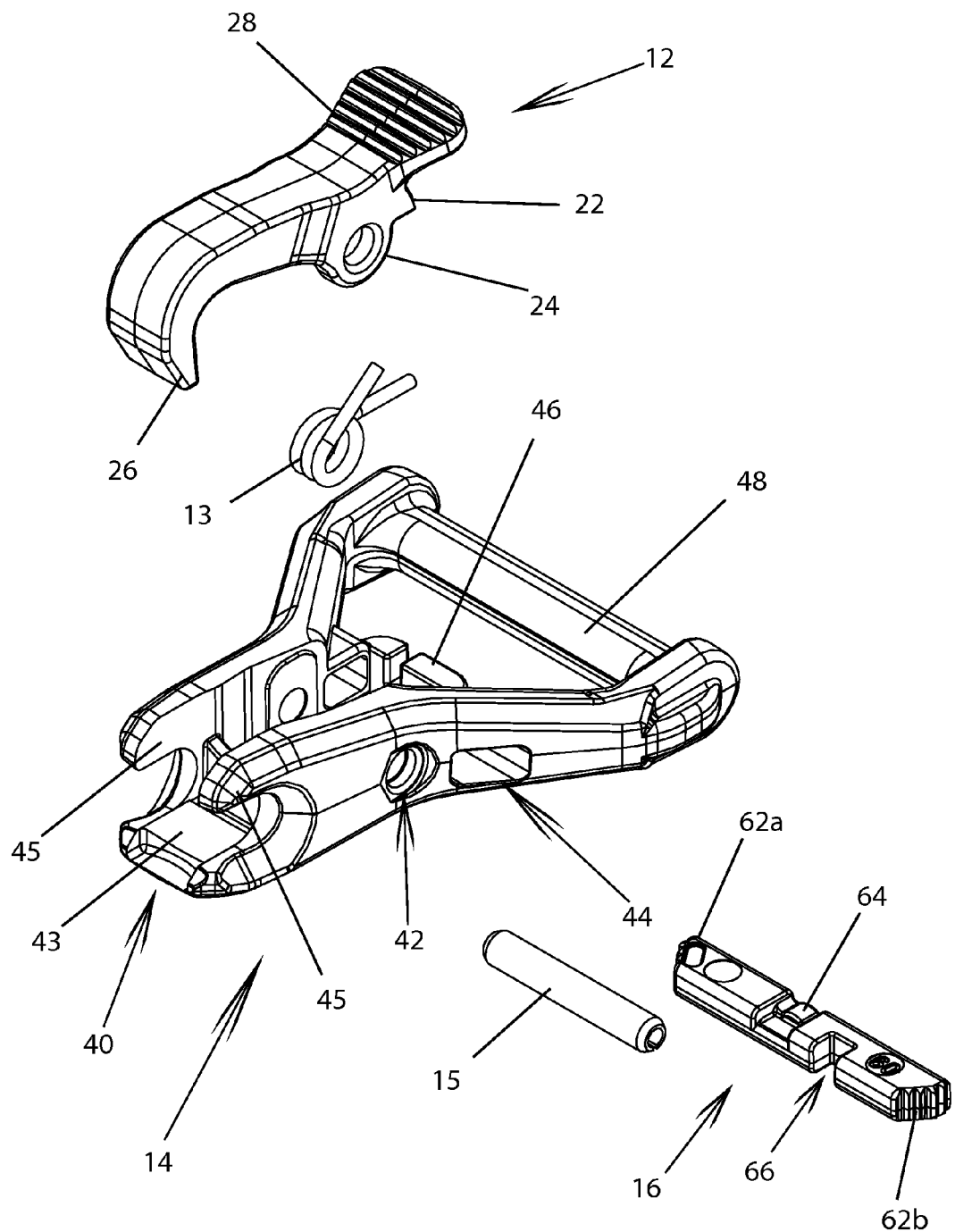
FIG. 3 is an exploded view of the fastener of FIG. 1.
Figure 4:
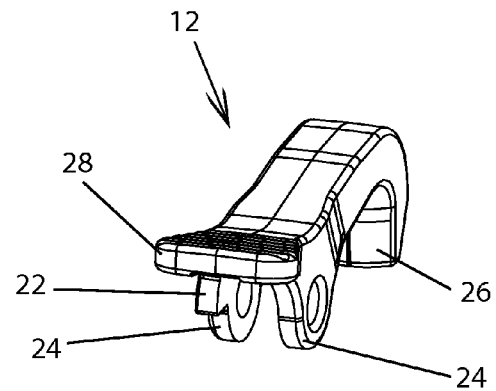
FIG. 4 is an alternate exploded view of the fastener of FIG. 1.
Figure 4:
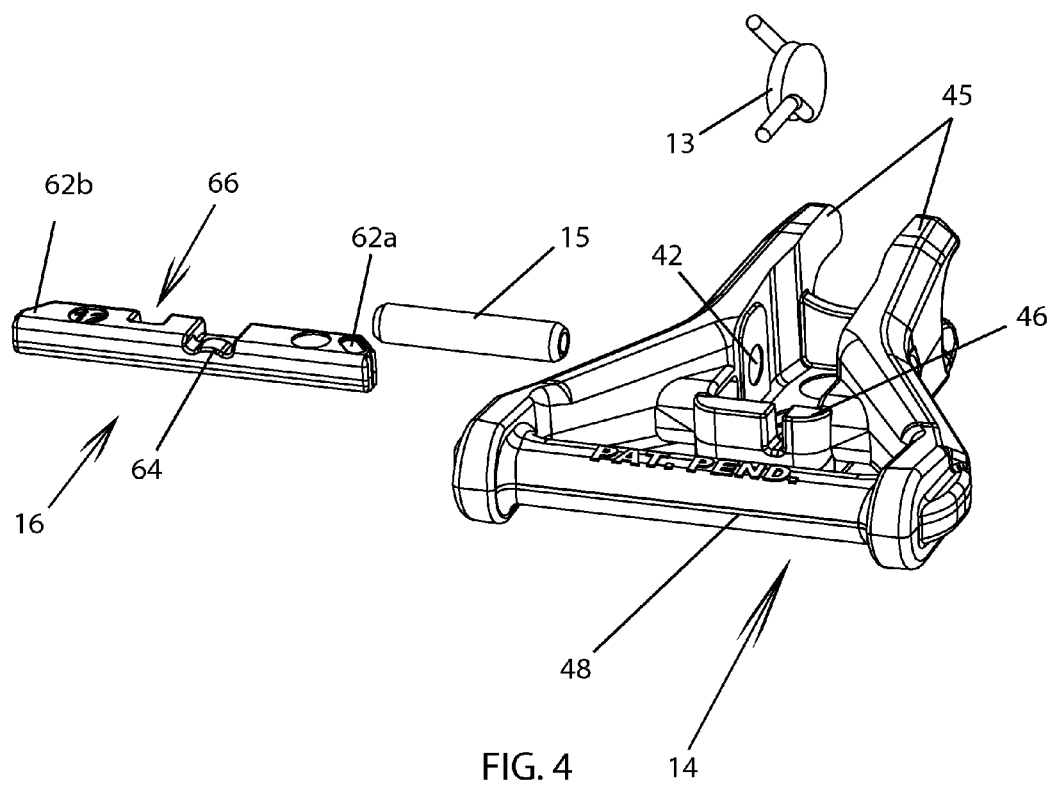
Figure 5:
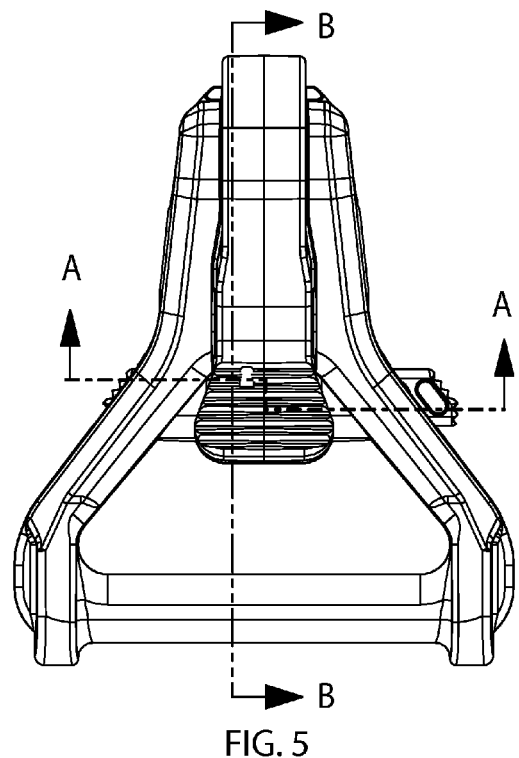
FIG. 5 is a plan view of the fastener of FIG. 1, unlocked.
Figure 6:
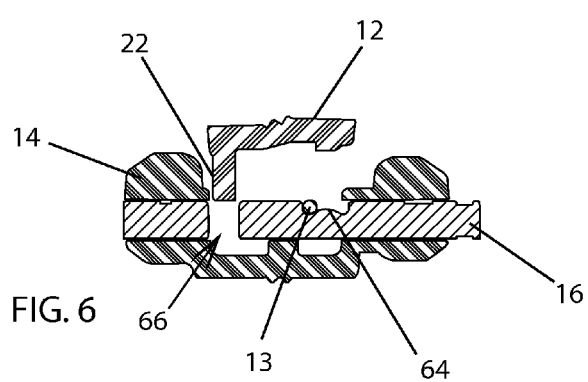
FIG. 6 is a sectional view of the fastener of FIG. 4, taken along line A-A.
Figure 7:
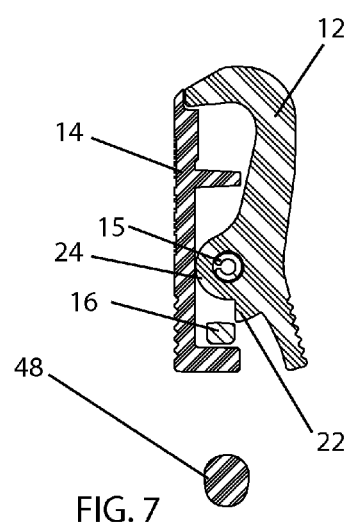
FIG. 7 is a sectional view of the fastener of FIG. 4, taken along line B-B.
Figure 11:
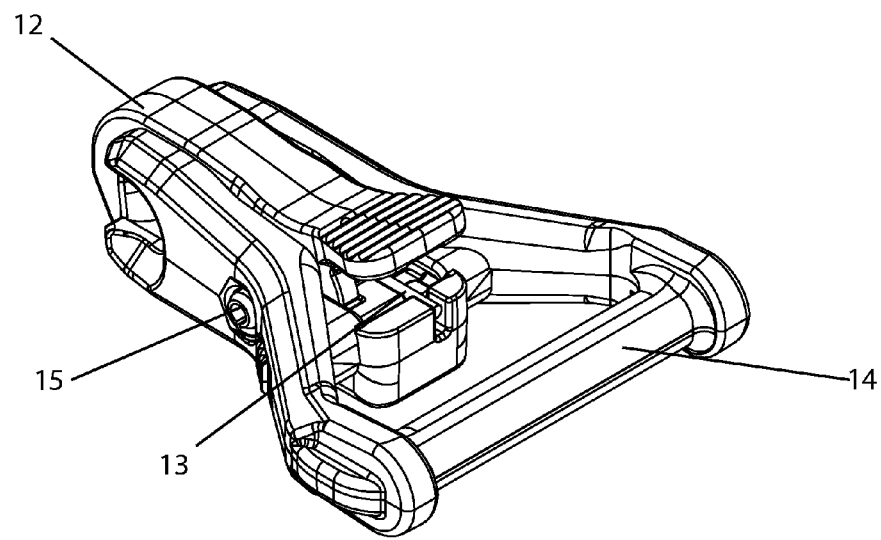
FIG. 11 is an alternate perspective view of the fastener of FIG. 1.

FIGS. 3 and 4 depict the components of the fastener in greater detail. The mandible 12 features a hooked tooth 26 on one end and a lever 28 on the other. Two distal tabs 24 are located on either side of the mandible 12, roughly one third of the length of the mandible 12 from a terminal end of the lever 28. Tabs 24 both feature coaxial through holes. A stop 22 is located on one side of the mandible 12 underneath the lever 28 and behind one tab 24. The maxilla 14 features a cradle 40 which interfaces with the hooked tooth 26. Cradle 40 features a floor 43 and two sides, which each terminate in a tooth 45, with space defined between each tooth 45 and the floor 43. Maxilla 14 also features an attachment bar 48 opposite the cradle. The attachment bar 48 defines a hind end of the maxilla 14. Two pivot holes 42 are provided in opposite walls of the maxilla 14, such that, when properly positioned, the holes in the tabs 24 are coaxial with the pivot holes 42. A roll pin 15 or similar structure is therein inserted to join the mandible 12 and maxilla 14 and serve as a pivot bar about which the jaw bodies respectively pivot. Torsion spring 13 is positioned about the roll pin 15, between the tabs 24, and is anchored with one arm in a slot on a back ridge 46 of the maxilla 14 (FIG. 11). The torsion spring 13 biases the jaw bodies in a closed position.

Figure 8:
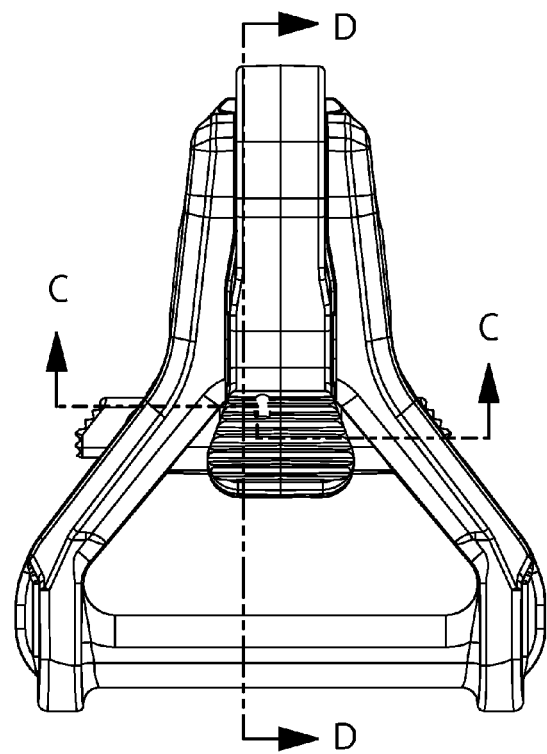
FIG. 8 is a plan view of the fastener of FIG. 1, locked.
Figure 9:
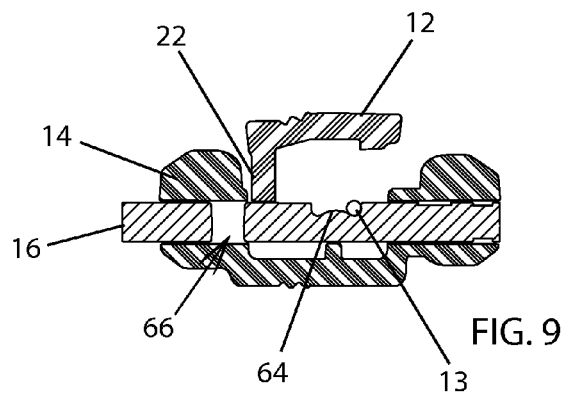
FIG. 9 is a sectional view of the fastener of FIG. 4, taken along line C-C.
Figure 10:
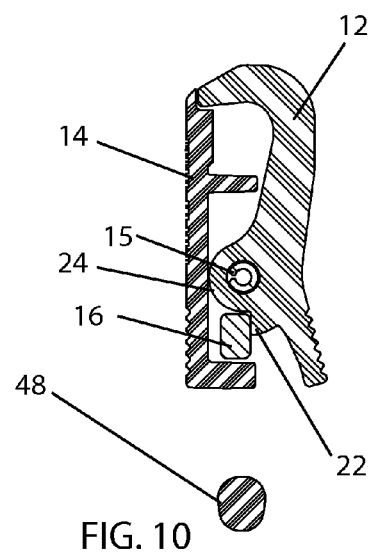
FIG. 10 is a sectional view of the fastener of FIG. 4, taken along line D-D.

The locking bar 16 passes through a channel 44 behind the pivot holes 42 in the maxilla 14. The locking bar features two tapered ends 62a, 62b, an off-center vertical notch 66 and a ridge 64 residing in a similarly off-center horizontal notch. Together, ridge 64 and the horizontal notch form two detents on either side of the ridge 64. When in position, the horizontal notch resides underneath the end of the spring 13 anchored in the back ridge 46. The interplay between these pieces is shown in a better view in FIG. 8.

In use, shown in FIGS. 5-10, the locking bar 16 is pushed to one side or the other. In an open position, shown in FIGS. 5-7, stop 22 is positioned over the notch 66, thereby allowing relative movement between the mandible 12 and maxilla 14. Spring 13 resides in an outer edge detent of the ridge 64 in the horizontal notch. Spring pressure biases the spring 13 against the locking bar 16 and maintains the locking bar's position. To lock the fastener, shown in FIGS. 8-10, a user presses the exposed tapered end of the locking bar 16 until enough force is applied to the spring 13 to cause it to jump ridge 64 and settle on its other side's detent. In this position, stop 22 is not positioned over vertical notch 66, but rather over a solid portion of the locking bar 16. This then prevents the mandible 12 and maxilla 14 from pivoting and opening the fastener. The locking bar 16 of the fastener then requires positive pressure from the user to switch from one position to another and remains in that position until the user consciously desires to change.

Figure 12:
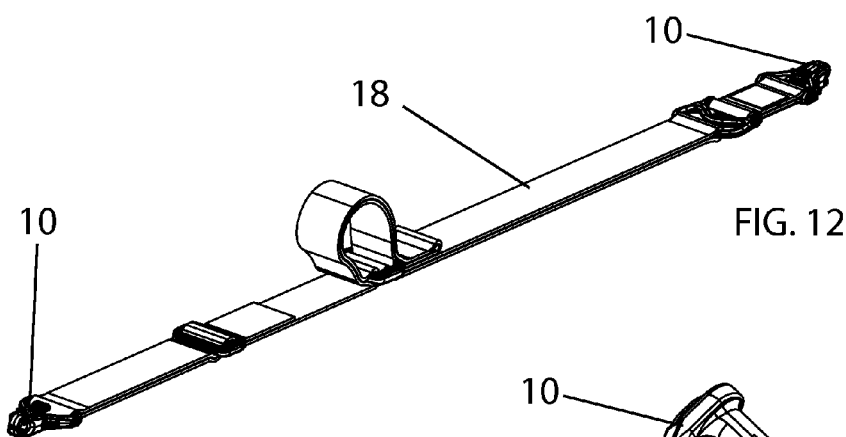
FIG. 12 is a perspective view of the fastener of FIG. 1 in use on either end of a sling.
Figure 13:
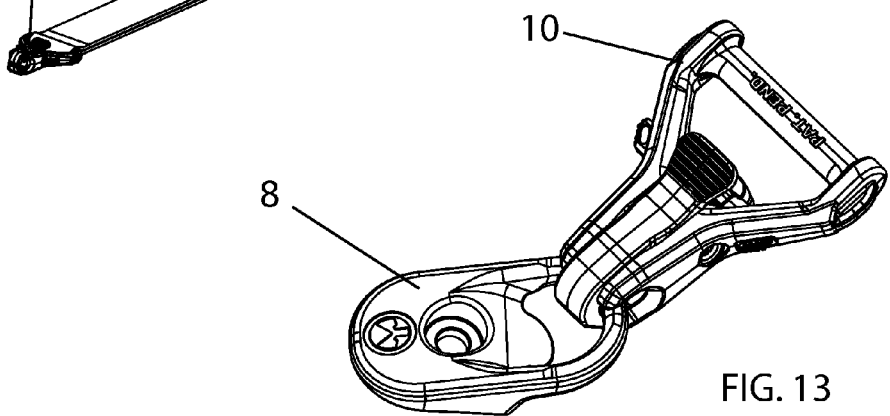
FIG. 13 is a perspective view of the fastener of FIG. 1, attached to a mounting loop.

This fastener 10 may be used in many different functions, such as the sling 18 shown in FIG. 12. In any setting, a strap may be secured about attachment bar 48 in any of the known, conventional means or through any means later discovered. In use, shown in FIG. 13, the fastener 10 is opened by unlocking it and depressing the lever 28 to separate the mandible 12 from the maxilla 14. A piece of connection hardware 8, such as a ring or bar, is positioned between the teeth 45 and floor 43 of the maxilla jaw 14 and the lever 28 released, thereby closing the hooked tooth 26 around the connection hardware. The fastener 10 is then locked as described above.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A clip fastener comprising:
    a. a mandible jaw, the mandible jaw further comprising:
        i. a hind lever end;
        ii. a two distal tabs, one on either side of the mandible jaw and each having a hole such that the holes are coaxial;
        iii. a stop tab positioned between one of the distal tabs and the hind lever; and
        iv. a forward hooked tooth; and
    b. a maxilla jaw, the maxilla jaw further comprising:
        i. a rear transverse bar extending from a jaw body;
        ii. a back ridge forward of the transverse bar;
        iii. a transverse lock channel having an open top and being forward of the back ridge; and
        iv. a forward cradle comprising a floor and two side walls, the side walls each having a tooth spaced apart from the floor and one orifice such that the orifices are diametrically opposite each other;
    c. a pivot bar, being inserted through the orifices of the maxilla jaw and the holes in the distal tabs of the mandible jaw;
    d. a spring situated about the pivot bar and anchored on the back ridge, positioned to bias the jaws in a closed relationship; and
    e. a lock bar, situated within the lock channel of the maxilla and capable of slidable motion therethrough, the lock bar further comprising:
        i. a vertical notch located off center of the lock bar;
        ii. a horizontal notch located on an upper half of the lock bar and off center on an opposite side of the vertical notch; and
        iii. a ridge residing within the horizontal notch such that two detents are formed by the ridge and an interior of the horizontal notch;
    wherein, horizontal notch of the lock bar resides under an end of the spring anchored upon the back ridge of the maxilla jaw such that upon moving the lock bar into open and closed positions the ridge of the lock bar being selectably located upon either side of the end of the spring and the stop tab will be over the lock bar when the lock bar is in a closed position and the stop tab will be positioned over the vertical notch in a manner that will allow passage of the stop tab and associated relative pivoting movement of the jaws when the lock bar is in an open position.

2. A locking mechanism for a fastener having two pivotable jaws and a torsion spring providing pivoting bias for said jaws, the locking mechanism comprising:
    a. a transverse bar, slidable through one of the pivotable jaws into, selectably, an open position and a closed position;
    b. a ridge residing off-center on a top side of the transverse bar in a manner to interface with a lower arm of the torsion spring;
    c. a vertical notch located oppositely off-center from the ridge on the transverse bar; and,
    d. a stop tab located on one of the jaws in a manner to interface with the transverse bar when the transverse bar is in the closed position and to interface with the notch when the transverse bar is in the open position.

3. The locking mechanism of claim 2, the ridge residing in a horizontal notch on the transverse bar.

* * * * *